No. 710,316. Patented Sept. 30, 1902.
J. M. BRYANT.
THILL COUPLING.
(Application filed May 15, 1902.)
(No Model.)
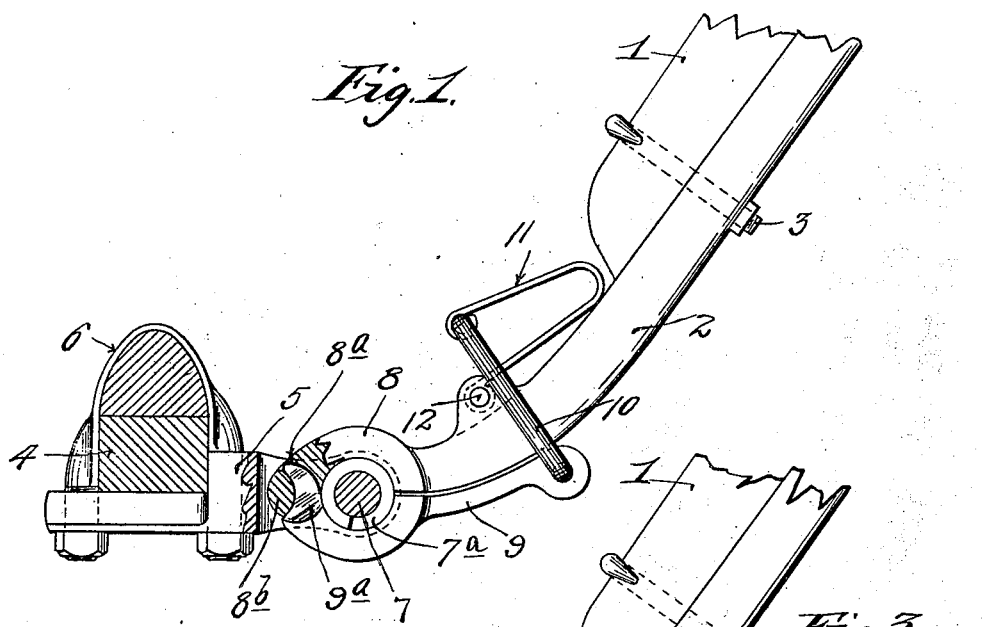
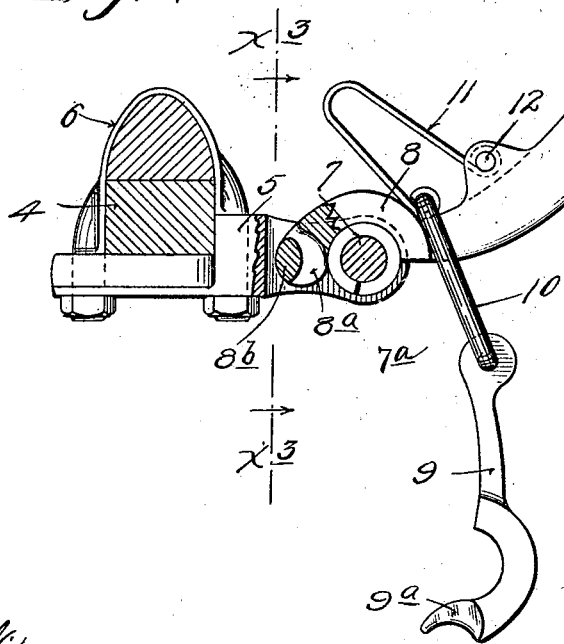
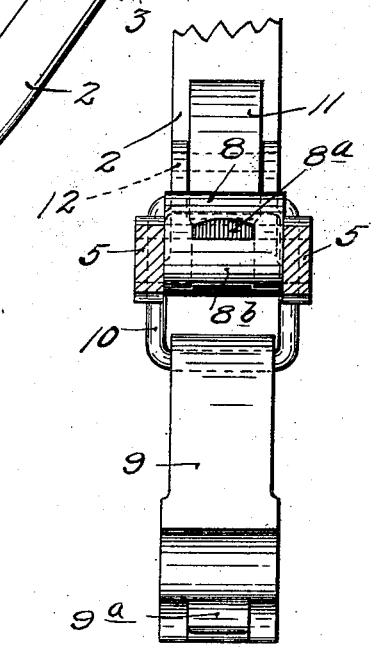
Witnesses,
H. D. Kilgore
C. H. Kelvin
Inventor,
John M. Bryant,
By his Attorneys,
Williamson & Merchant

UNITED STATES PATENT OFFICE.

JOHN M. BRYANT, OF MINNEAPOLIS, MINNESOTA, ASSIGNOR OF THREE-FOURTHS TO EBENEZER J. NEWELL AND PERCY A. BARNARD, OF DETROIT, MICHIGAN, AND JOSEPH L. HENRY, OF CHICAGO, ILLINOIS.

THILL-COUPLING.

SPECIFICATION forming part of Letters Patent No. 710,316, dated September 30, 1902.

Application filed May 15, 1902. Serial No. 107,424. (No model.)

*To all whom it may concern:*

Be it known that I, JOHN M. BRYANT, a citizen of the United States, residing at Minneapolis, in the county of Hennepin and State of Minnesota, have invented certain new and useful Improvements in Thill-Couplings; and I do hereby declare the following to be a full, clear, and exact description of the invention, such as will enable others skilled in the art to which it appertains to make and use the same.

My present invention has for its object to provide an improved coupling for thills, poles, &c.; and to this end it consists of the novel devices and combinations of devices hereinafter described, and defined in the claims.

The invention is illustrated in the accompanying drawings, wherein like characters indicate like parts throughout the several views.

Figure 1 is a view, principally in side elevation, but with some parts sectioned, showing a portion of a pair of thills and the front axle of a vehicle, the said parts being connected by one of my improved couplings. Fig. 2 is a similar view to Fig. 1, but shows one of the jaws of the coupling thrown into an inoperative position; and Fig. 3 is a section on the line $x^3$ $x^3$ of Fig. 2.

The numeral 1 indicates portions of the thills, to which metal straps 2 are rigidly secured in the ordinary or any suitable way—as, for instance, by nutted bolts 3.

The numeral 4 indicates the front axle of a vehicle, to which a coupling-bracket 5 is secured by means of a yoke-clip 6 or in any other suitable way. A coupling-bolt 7 is passed through the ears of the bracket 5, and, as shown, a split bushing $7^a$, of rubber or leather, is placed directly around the said bolt.

The coupling involves a pair of jaws 8 and 9, which are formed with coöperating semicylindrical seats, that closely fit the bushing $7^a$ where such bushing is provided or which would be made to closely fit the coupling-bolt in case such bushing were not provided. The coupling-jaw 8 is shown as formed integrally with the strip 2 and as provided at its inner end with a curved hook-seat $8^a$, which is so extended as to leave a retaining lug or web $8^b$ at its convex surface. At its outer end the coupling-jaw 9 is pivoted to a link 10, which link is pivoted to the free end of a U-shaped spring-lever 11, which lever in its turn is pivoted at 12 to the coupling-jaw 8. At its inner or free end the coupling-jaw 9 is provided with a hook or curved lock-finger $9^a$, which fits into the hook-seat $8^a$ of the coupling-jaw 8 when the parts are turned into the position indicated in Fig. 1.

By reference to Fig. 1 it will be noted that with the spring-lever 11 in the position shown the line of strain exerted by said spring-lever on the link 10 is outward of the pivot 12, so that the said lever is thrown beyond a dead-center and securely held in its locking position by its own spring tension.

As is evident, while the free end of the coupling-jaw 9 is held as indicated in Fig. 1 its hook or finger $9^a$ by engagement within the seat $8^a$ and with the retaining lug or web $8^b$ securely holds the inner end of said jaw 9 against downward movement, such as would be necessary to uncouple the parts. It is further evident that when the spring-lever 11 is turned rearward into the position indicated in Fig. 2 the free or forward end of the coupling-jaw 9 may be freely moved downward and is, in fact, thrown downward in such a manner that the hook or finger $9^a$ will be carried out of the seat $8^a$ and the coupling-jaws 8 and 9 thereby separated. Of course when the coupling-jaws are separated the thills may be readily applied in working position.

As the coupling-jaw 9 is thrown forward when uncoupled, it makes the application of the jaw 8 to the coupling bolt or bushing an extremely easy matter, since it is only necessary to drop the said jaw 8 onto the said bolt and bushing to bring the same to proper position. The hook or finger $9^a$ is inserted into the seat $8^a$ by giving the jaw 9 a slight endwise and pivotal movement, and it is of course released by a similar but reverse movement. While the said jaw 9 is separable from the coöperating jaw 8, it is, nevertheless, always secured in position where it may be easily reached, but so that it cannot be lost.

The device is of simple construction and of small cost and is extremely efficient for the purposes had in view.

What I claim, and desire to secure by Letters Patent of the United States, is as follows:

1. In a coupling for thills, poles, &c., the combination with a pair of coupling-jaws having, at their rear ends, interlocking parts forming a separable joint adapted to be connected and disconnected by angular movements of one of said jaws with respect to the other, of a clamping device applied to the forward ends of said clamping-jaws for holding the same in working position, substantially as described.

2. In a coupling for thills, poles, &c., the combination with a pair of separable jaws connected at their rear ends by a coöperating hook and hook-seat, one on each of said jaws, of a link pivoted to one of said jaws, and a spring-lever pivoted to the other of said jaws and to said link, and movable from one side to the other of a dead-center, to lock and release the said movable jaw, substantially as described.

3. In a coupling for thills, poles, &c., the combination with the jaws 8 and 9 having, respectively, the hook-seat $8^a$ and hook $9^a$, detachably engageable as described, of the link 10 pivoted to the outer end of said jaw 9, and the U-shaped spring-lever 11 pivoted to said link 10 and pivoted to said jaw 8, which spring-lever 11 is movable rearward of its dead-center, to release said jaw 9, and is movable forward of its dead-center to lock the said jaw 9, substantially as described.

In testimony whereof I affix my signature in presence of two witnesses.

JOHN M. BRYANT.

Witnesses:
 ELIZABETH H. KELIHER,
 F. D. MERCHANT.